US009015338B2

(12) United States Patent
Saidi et al.

(10) Patent No.: US 9,015,338 B2
(45) Date of Patent: Apr. 21, 2015

(54) METHOD AND APPARATUS FOR SUPPRESSING SILENCE IN MEDIA COMMUNICATIONS

(75) Inventors: Ben Saidi, San Diego, CA (US); Mark Lindner, Aliso Viejo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1474 days.

(21) Appl. No.: 10/626,048

(22) Filed: Jul. 23, 2003

(65) Prior Publication Data

US 2005/0044256 A1 Feb. 24, 2005

(51) Int. Cl.
*G06F 15/16* (2006.01)
*G06F 15/173* (2006.01)
*H04L 29/06* (2006.01)

(52) U.S. Cl.
CPC ........... *H04L 65/605* (2013.01); *H04L 65/4061* (2013.01); *H04L 65/80* (2013.01)

(58) Field of Classification Search
CPC . H04L 65/80; H04L 65/1089; H04L 65/1066; H04L 65/1069; H04L 65/4084; H04L 67/2828; H04L 67/32; H04L 67/322; H04L 65/103; H04L 65/605; H04L 41/0896; H04L 65/40; H04L 65/403; H04L 65/4038
USPC ........... 370/234, 235, 352, 394, 395.61, 435, 370/521, 230, 401, 470, 474, 231, 286; 709/217, 203, 207, 227, 228, 229, 231, 709/232, 234, 235, 236, 246, 247, 249; 455/416, 67.11, 570, 63.1, 67.13
See application file for complete search history.

(56) References Cited

U.S. PATENT DOCUMENTS 4,696,039 A * 9/1987 Doddington .................. 704/215
5,553,190 A * 9/1996 Ohya et al. ..................... 704/201
5,612,955 A * 3/1997 Fernandes et al. ............ 370/433
5,831,981 A * 11/1998 Tanimura et al. ........ 370/395.61
5,842,113 A * 11/1998 Nanda et al. ..................... 455/69
5,870,397 A * 2/1999 Chauffour et al. ............ 370/435
6,069,881 A * 5/2000 Jiang et al. ..................... 370/318
6,078,809 A * 6/2000 Proctor ......................... 455/416
6,130,888 A 10/2000 Tsuboya et al.
6,199,036 B1 3/2001 Ahmadi
6,219,339 B1 * 4/2001 Doshi et al. ................... 370/235
6,233,251 B1 * 5/2001 Kurobe et al. ................ 370/471

(Continued)

FOREIGN PATENT DOCUMENTS

CN 1166251 A 11/1997
JP 03133233 6/1991

(Continued)

OTHER PUBLICATIONS

Suppress, Answers.com, The American Heritage Online Dictionary, pp. 1-5.*

(Continued)

*Primary Examiner* — Saket K Daftuar
(74) *Attorney, Agent, or Firm* — Raphael Freiwirth

(57) ABSTRACT

A method and apparatus for suppressing silence frames in a stream of media includes receiving a stream of media from a user and suppressing at least one silence frame from the received stream of media. The suppressed silence frame includes an initial silence frame situated before a first media frame and/or a silence frame situated between two successive media frames.

31 Claims, 6 Drawing Sheets

206 208 204
210 DATA SOURCE → 212 TX DATA PROCESSOR → 214 MOD → 216 TMTR → 218 D → 220
250 → 252 D → 254 RCVR → 256 DEMOD → 258 RX DATA PROCESSOR → 260 DATA SINK
230 CONTROLLER
270 CONTROLLER ↔ TO/FROM BSC
228 DATA SINK ← 226 RX DATA PROCESSOR ← 224 DEMOD ← 222 RCVR
TMTR 268 ← 266 MOD ← 264 TX DATA PROCESSOR ← 262 DATA SOURCE

502: 1 2 A B C 3 4 5 D E 6 F G H I J K L 7 8 M N O P Q R S
504: $t_1$ $t_2$ SUPPRESS 1 2 A B C 3 4 5 D E 6 F G H I J K L 7 8 M N O P Q R S
506: $t_1$ $t_2$ 1 2 A B C 3 4 5 D E 6 F G H I J K L 7 8 M N O P Q R S PUNCTURED PUNCTURED

(56) References Cited

U.S. PATENT DOCUMENTS

| | | | | |
|---|---|---|---|---|
| 6,247,058 | B1 * | 6/2001 | Miller et al. | 709/234 |
| 6,282,196 | B1 * | 8/2001 | Lyons et al. | 370/394 |
| 6,324,188 | B1 | 11/2001 | Tsuji | |
| 6,377,931 | B1 * | 4/2002 | Shlomot | 704/503 |
| 6,480,556 | B1 * | 11/2002 | Guey | 375/343 |
| 6,535,505 | B1 * | 3/2003 | Hwang et al. | 370/352 |
| 6,535,844 | B1 * | 3/2003 | Wood et al. | 704/210 |
| 6,693,921 | B1 * | 2/2004 | Whitfield | 370/516 |
| 6,700,895 | B1 * | 3/2004 | Kroll | 370/412 |
| 6,785,262 | B1 * | 8/2004 | Yao et al. | 370/352 |
| 6,785,339 | B1 * | 8/2004 | Tahernezhaadi et al. | 375/241 |
| 6,934,756 | B2 * | 8/2005 | Maes | 709/227 |
| 6,999,921 | B2 * | 2/2006 | Harris et al. | 704/215 |
| 7,031,311 | B2 * | 4/2006 | MeLampy et al. | 370/392 |
| 7,089,178 | B2 * | 8/2006 | Garudadri et al. | 704/205 |
| 7,103,003 | B2 * | 9/2006 | Brueckheimer et al. | 370/252 |
| 7,142,551 | B2 * | 11/2006 | Barrack et al. | 370/412 |
| 7,362,707 | B2 * | 4/2008 | MeLampy et al. | 370/235 |
| 2002/0026310 | A1 * | 2/2002 | Mochida et al. | 704/201 |
| 2003/0115045 | A1 * | 6/2003 | Harris et al. | 704/214 |
| 2004/0001494 | A1 * | 1/2004 | Barrack et al. | 370/395.61 |
| 2004/0071442 | A1 * | 4/2004 | Wells | 386/66 |
| 2004/0179555 | A1 * | 9/2004 | Smith | 370/521 |

FOREIGN PATENT DOCUMENTS

| | | | |
|---|---|---|---|
| JP | 10064542 | | 3/1998 |
| JP | 10065642 | A | 3/1998 |
| JP | 11239157 | | 8/1999 |
| JP | 2000307654 | A | 11/2000 |
| JP | 2002077233 | A | 3/2002 |
| JP | 2002164921 | A | 6/2002 |
| WO | 0124165 | | 4/2001 |
| WO | 03021830 | | 3/2003 |

OTHER PUBLICATIONS

Claypool, M., "Silence Is Golden?—The Effects of Silence Deletion on the CPU Load of an Audio Conference", Jun. 30, 1993, pp. 1-46, XP055067169.

International Search Report—PCT/US2004/023576, International Searching Authority/US-Alexandria, Virginia—Nov. 21, 2005.

Loo, C., et al.: "An Adaptive Silence Deletion Algorithm for Compression of Telephone Speech," Communications, Computers and Signal Processing, 1997. 10 Years Pacrim 1987-1997-Networking the Pacific Rim.

Supplementary European Search Report—EP04778890—Search Authority—Munich—Jun. 25, 2013.

Written Opinion—PCT/US2004/023576, International Searching Authority/US-Alexandria, Virginia—Nov. 21, 2005.

* cited by examiner

METHOD AND APPARATUS FOR SUPPRESSING SILENCE IN MEDIA COMMUNICATIONS

FIELD

The present invention relates to point to point or point to multi-point communications systems. More specifically, the present invention relates to methods and apparatus for suppressing silence frames in media communications.

BACKGROUND

In wireless communications systems, a stream of media, such as voice, video, data, picture, includes some undesirable silence periods that cause end-to-end media communication latency. Such silence frames include initial silence frames appearing ahead of the first actual media frame as well as silence frames that appear between successive media frames. To reduce call set-up and media-delivery latency, it is desirable to minimize such silence periods.

For example, a class of wireless services intended for quick, efficient, one-to-one or one-to-many (group) communication has existed in various forms for many years. In general, these services have been half-duplex, where a user presses a "push-to-talk" (PTT) button on a phone/radio to initiate a group call. If granted the floor, the talker then generally speaks for a few seconds. After the talker releases the PTT button, other users may request the floor. These services have traditionally been used in applications where one person, a "dispatcher," needs to communicate with a group of people, such as field service personnel or construction site workers, which is where the "dispatch" name for the service comes from. A key feature of these services is the desirability of quick call set up and media delivery.

There is a need, therefore, for mechanisms to reduce end-to-end media communication latency.

SUMMARY

The disclosed embodiments provide novel and improved methods and apparatus for suppressing silence frames in media communications. In one aspect, a method in a communication device (CD) for suppressing silence frames in media communications includes receiving a stream of media from a user and suppressing at least one silence frame from the received stream of media.

In one aspect, an apparatus for suppressing silence frames in media communications includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description of disclosed embodiments set forth below when taken in conjunction with the drawings, and wherein.

DETAILED DESCRIPTION

Figure 1:
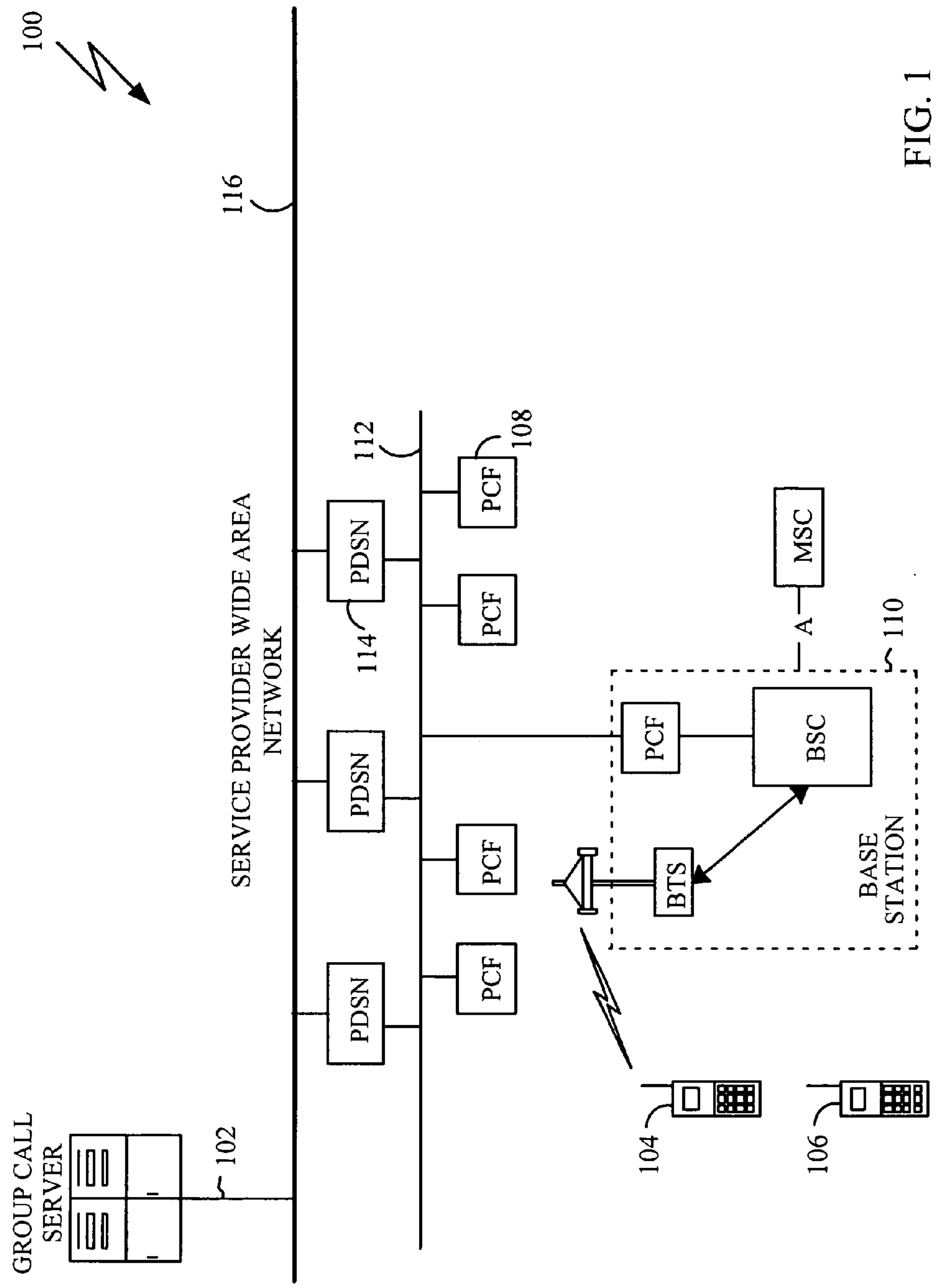
FIG. 1 illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a functional block diagram of a group communication system 100, for implementing one embodiment. Group communication system 100 is also known as a push-to-talk (PTT) system, a net broadcast service (NBS), a dispatch system, or a point-to-multi-point communication system. In one embodiment, group communication system 100 includes a group call server 102, which may be deployed in either a centralized deployment or a regionalized deployment.

Group communication devices (CDs) 104 and 106, which may be deployed such as cdma2000 handset, for example, may request packet data sessions using a data service option. Each CD may use the session to register its Internet Protocol (IP) address with the group call server to perform group call initiations. In one embodiment, group call server 102 is connected to the service provider's packet data service nodes (PDSNs) through a service provider's wide area network 116. CDs 104 and 106, upon requesting packet data sessions from the wireless infrastructure, may have IP connectivity to group call server 102 through a PDSN 114. The PDSNs provide interface between transmission of data in the fixed network and the transmission of data over the air interface. Each PDSN may interface to a base station controller (BSC) through a packet control function (PCF) 108 and a network 112. The PCF may be co-located with the BSC within a base station (BS) 110.

A packet data service node may fall in one of several states, e.g., active or connected state, dormant state, and null or inactive state. In the active or connected state, an active traffic channel exists between the participating CD and the BS or BSC, and either side may send data. In the dormant state, no active traffic channel exists between the participating CD and the BSC, but a point-to-point (PPP) link is maintained between the participating CD and the PDSN. In the null or inactive state, there is no active traffic channel between the participating CD and the BSC, and no PPP link is maintained between the participating CD and the PDSN.

After powering up, CDs 104 and 106 may request packet data sessions. As part of establishing a packet data session, each CD may be assigned an IP address. Each CD may perform a registration process to notify group call server 102 of the CD's IP address. Registration may be performed using an IP protocol, such as session initiation protocol (SIP) over user datagram protocol (UDP). The IP address of a CD may be used to contact the CD when the corresponding user is invited into a group call.

Once a group call is established, CDs 104 and 106 and group call server 102 may exchange media and signaling messages. In one embodiment, media may be exchanged between the participating CDs and the group call server by using real-time protocol (RTP) over UDP. The signaling messages may also be exchanged by using a signaling protocol over UDP.

Group communication system 100 performs several different functions in order to operate group call services. The functions that relate to the user side include user registration, group call initiation, group call termination, sending alerts to group participants, late join to a group call, talker arbitration, adding members to a group, removing members from a group, un-registering a member, and authentication. The functions that relate to system preparation and operation include administration and provisioning, scalability, and reliability.

Figure 2:
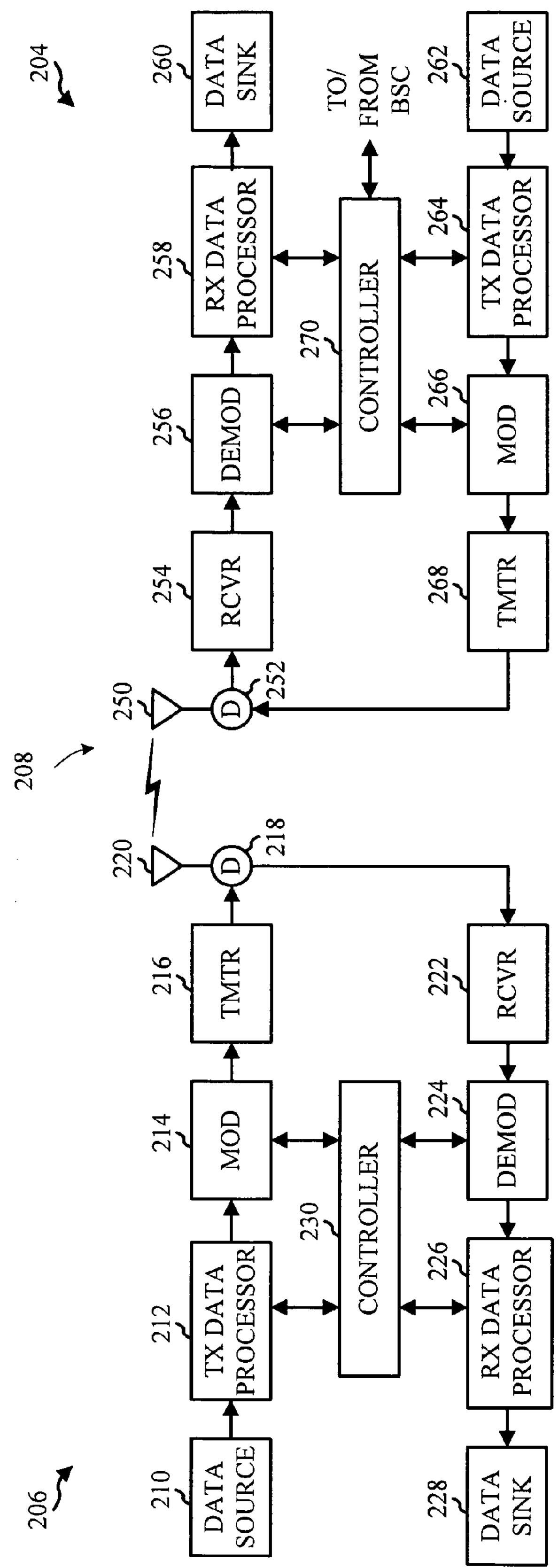
FIG. 2 illustrates an embodiment for a base station and a mobile station operating in FIG. 1.

FIG. 2 is a simplified block diagram of an embodiment of base station 204 and mobile station 206, which are capable of implementing various disclosed embodiments. For a particular communication, voice data, packet data, and/or messages may be exchanged between base station 204 and mobile station 206, via an air interface 208. Various types of messages may be transmitted, such as messages used to establish a communication session between the base station and mobile station, registration and paging messages, and messages used to control a data transmission (e.g., power control, data rate information, acknowledgment, and so on). Some of these message types are described in further detail below.

For the reverse link, at mobile station 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Base station 204 may receive registration information and status information, e.g., mobile station mobility rate, from mobile station 206. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receiving (RX) data processor 258 then decodes the symbols to recover the data and messages transmitted on the reverse link. The recovered voice/packet data is provided to a data sink 260 and the recovered messages may be provided to a controller 270. Controller 270 may include instructions for receiving media, buffering media, suppressing silence frames in the media, and transmitting the media to a group of target CDs.

The processing by demodulator 256 and RX data processor 258 are complementary to that performed at mobile station 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to mobile station 206. Forward link signals include paging signals.

At mobile station 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230. Controller 230 may include instructions for receiving media, buffering media, suppressing silence frames in the media, and transmitting the media to a group of target CDs.

The group call service (GCS) may allow one user to talk to a group of users in a half-duplex or full-duplex mode. In the former case, because only one person may be permitted to talk at a time, the permission to talk may be moderated by the infrastructure. In such systems, a user may request permission to talk by pressing a "push-to-talk" button (PTT), for example. The system may arbitrate the requests received from multiple users and, through a contention-resolution process, the system may choose one of the requestors according to a predetermined algorithm. The system may then notify the chosen user that the user has permission to talk. The system may transparently dispatch the user's traffic information, such as voice and/or data, from the authorized talker to the rest of the group members, who may be considered "listeners." The voice and/or data traffic in GCS may be different from the classical one-to-one phone call, and a priority may be placed on some conversations.

Figure 3:
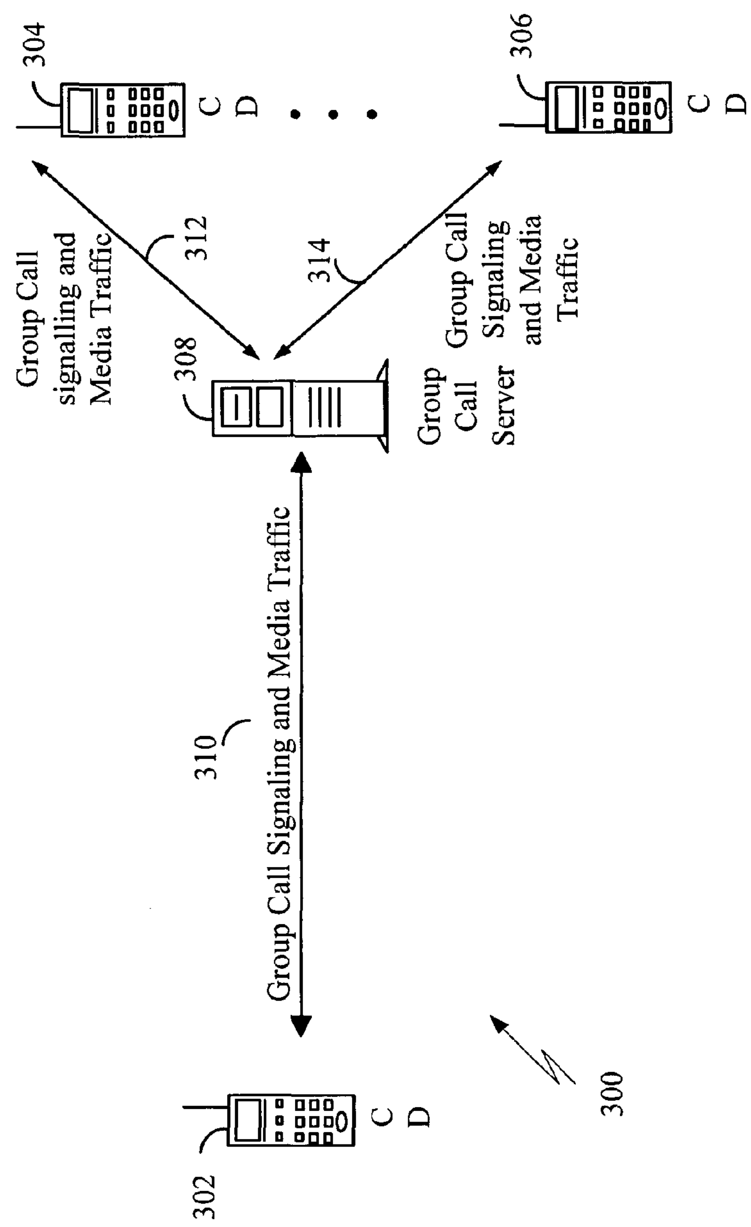
FIG. 3 illustrates how several communication devices interact with a group call server.

FIG. 3 illustrates a group call arrangement 300 for showing how CDs 302, 304, and 306 interact with a group call server 308. Multiple group call servers may be deployed as desired for large-scale groups. In FIG. 3, when CD 302 has permission to transmit media to other members of the group, CD 302 is known as the talker and may transmit media over an established channel. When CD 302 is designated as the talker, the remaining participants, CD 304 and CD 306 are designated as listeners. As described above, CDs 302, 304, and 306 are connected to group call server 308 using at least one channel (310, 312, 314). In one embodiment, the channel may include a session initiation protocol (SIP) channel, a media-signaling channel, and a media traffic channel.

Figure 4:
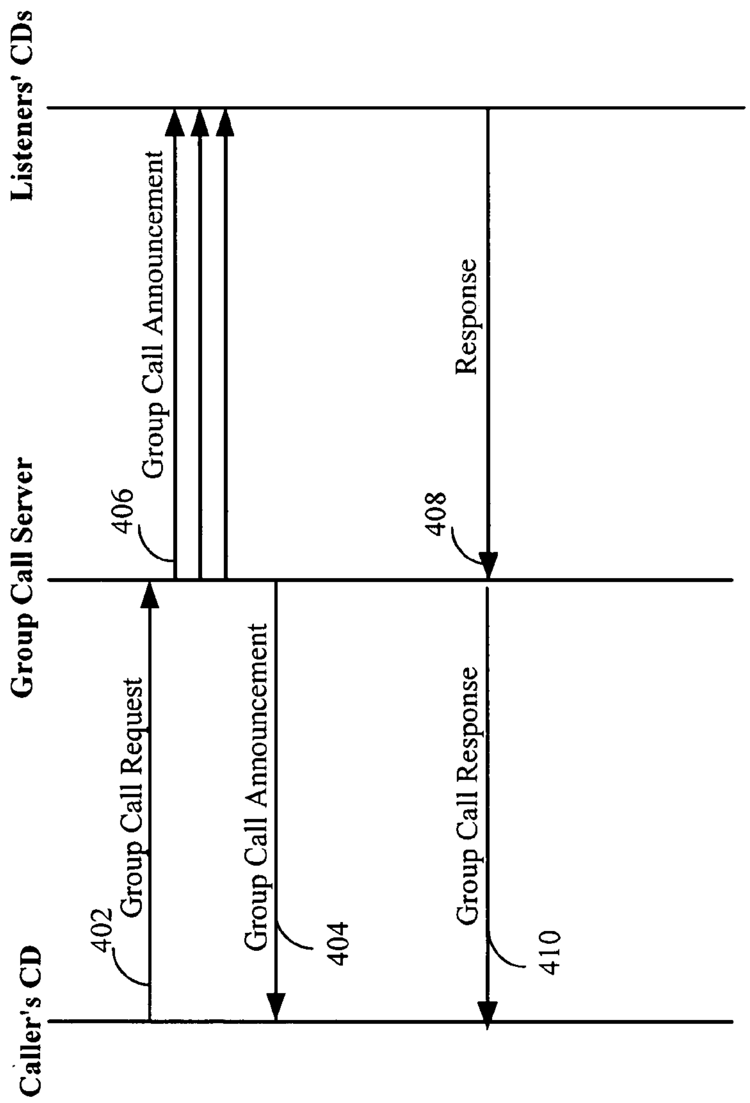
FIG. 4 illustrates a call-setup process according to one embodiment.

FIG. 4 illustrates a message-flow diagram showing a group call setup, according to one embodiment. A user who wishes to initiate a group call may select one or more target users, one or more pre-defined groups, or a combination of the two and may depress the push-to-talk (PTT) button on a CD, for example. The caller's CD may then send a group call request 402 to the group call server to setup the group call. The caller's CD may be in a dormant packet data session when the caller initiates the group call. The group call request may be transmitted regardless of whether the caller's CD has a dedicated traffic channel or not. After the group call request is sent, if the caller's CD is in dormant packet data session, the caller's CD may initiate the process of re-establishing its dedicated traffic channel and prepare the packet data session for media activity.

When the group call server receives the group call request, the group call server may expand the pre-defined groups, if any is specified in the received group call request, into a list of group members. The group call server may retrieve location information for the desired target group members. The group call server may also determine if the target group is already running in the system. FIG. 4 shows a scenario in which the group is not already running.

After the group call server locates at least one of the target group members, the group call server may send a response 404 back to the caller's CD indicating that the group call is being set up. At this point, the caller's CD may optimistically grant the caller's request to talk. The caller's CD may start buffering the received media for future transmission to the group call server, as discussed herein later. The group call server may use the location information of the target listeners CDs to send out announcements 406 to the target listeners' CDs. Sending the announcements may trigger the packet data sessions of the target listeners' CDs to come out of dormancy and to re-establish their traffic channels. After at least one of the target listener's has responded to the group call announcements 406, the group call server receives the response 408, and delivers a group call response 410 to the caller's CD.

In one embodiment, the group communication system supports both chat-room and ad-hoc models for group call services. In the chat-room model, groups are predefined, which may be stored on the group call server. The predefined groups, or nets, may be public, implying that the group has an open member list. In this case, each group member is a potential participant in a group call. The group call is started when a first group member starts to initiate a group call. The call remains running for a predetermined time period, which may be configured by the service provider. During a group call, the group members may specifically request to join or leave the call. During periods of talk inactivity, the group call may be brought into a group dormant state until a group member requests permission to talk. When operating in the chat-room model, group members, also known as net members, communicate with one another using a communication device assigned to each net member. The term "net" denotes a group of members authorized to communicate with each other.

In the ad-hoc model of group call services, however, groups may be defined in real-time and have a closed member list associated with each group. A closed member list may specify which members are allowed to participate in the group call. The member list may not be available to others outside of the closed member list, and may only exist for the life of the call. Ad-hoc group definitions may not be stored in the group call server. The definitions may be used to establish the group call and released after the call has ended. An ad-hoc group may be formed when a caller selects one or more target members and generates a group call request, which is sent to the group call server to start the call. The group call server may send a notification to the target group members that they have been included in the group. The group call server may automatically join the target members into the group call, i.e., no action may be required from the target members. When an ad-hoc call becomes inactive, the group communication server may "tear down" the call and free the resources assigned to the group, including the group definition used to start the call.

The call set up time that starts with sending the group call request 402 from the caller's CD and ends with the caller's CD receiving the group call response 410 from the group call server. The goal for responding to the PTT or group call request is to consistently respond to the request within a predetermined short time period. In many cases, when a caller requests to setup a group call, the caller's packet data session is dormant, meaning that no dedicated traffic channel exists. Re-establishing active channels may take considerable time. In one embodiment, the group call server pages the target listeners' CDs to locate the CDs.

The call set up latency and media transmission delay may be reduced by suppressing or puncturing silence frames appearing in the media. In one embodiment, some or all of the silence frames situated before the initial media activity immediately after a user is granted floor for media delivery, e.g., initial media spurt, may be suppressed before the media is transmitted over the network. In one embodiment, in which the received media may be first buffered before being transmitted to the target listeners, some of the silence frames situated between two successive media frames may be punctured before the media is transmitted over the network.

Figure 5:
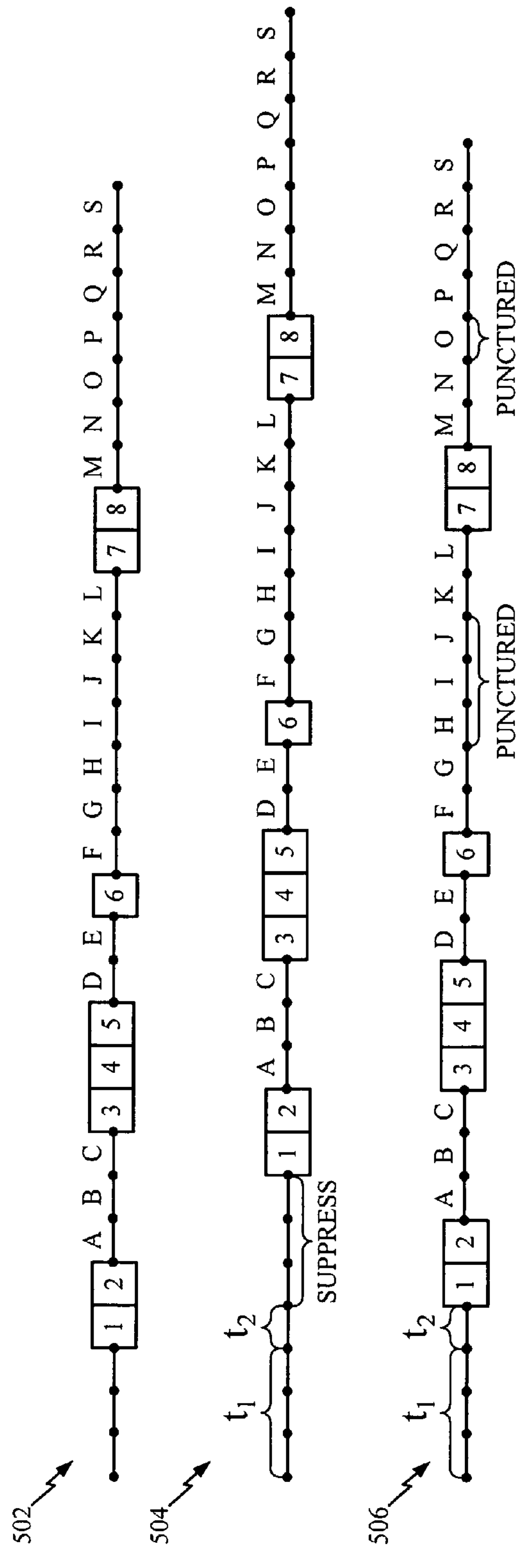
FIG. 5 illustrates one embodiment for a silence-frame suppression process.

FIG. 5 shows one embodiment for a silence-frame suppression process. For example, a talker's CD receives a stream of media 502. The stream of media 502 includes media frames 1, 2, 3, 4, 5, 6, 7, and 8, which may be transmitted at a full, half, quarter, or eighth frame rate. The initial media spurt frame 1 is preceded by three initial silence frames. The media frame 2 is separated from the media frame 3 by silence frames A, B, and C. The media frame 5 is separated from the media frame 6 by silence frames D and E. The media frame 6 is separated from the media frame 7 by silence frames F, G, H, I, J, K, and L. The media frame 8 is followed by silence frames M, N, 0, P, Q, R, and S.

When the media stream 502 is transmitted to a target CD without silence frame suppression, the target CD receives the media stream 504. The media stream goes through a media transmission latency, which includes a call set up delay t1 and a transmission delay t2. The call set up delay t1 includes the time it takes for the caller's CD to send a call request 402 to the time the caller's CD receive a call response 410. The transmission delay includes the time it takes to transmit media from the caller's CD to a target's CD.

In one embodiment, the media transmission latency is reduced by suppressing the initial silence frames that precede the initial media spurt frame 1. When the media stream 502 is received at the target CD and the initial silence frames that precede the initial media spurt frame 1 is suppressed, the media stream 506 is received at the target CD.

In one embodiment, the media transmission latency is reduced by suppressing some of the silence frames separating successive media frames. In one embodiment, a predetermined number of silence fames that separate successive media frames may be transmitted to the target CD, so that the media recognition is not undesirably affected. In one embodiment, the silence frame that follows a first predetermined number of silence frames following a first media frame and precedes a second predetermined number of silence frame preceding a media frame subsequent to the first media frame is suppressed.

Figure 6:
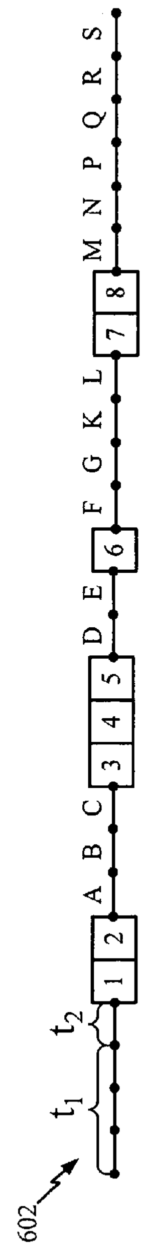
FIG. 6 illustrates one embodiment for a silence-frame suppression process.

FIG. 6 shows the media stream 602 that the target CD receives after the caller's CD has suppressed some of the silence frames that separate two successive media frames. In this example, two silence frames following a media frame and two silence frames preceding a subsequent media frame are transmitted. Therefore, none of the silence frames A, B and C is suppressed. Likewise, none of the silence frames D and E is suppressed.

The silence frames F and G are not suppressed because these two silence frames follow the media frame 6. The silence frames K and L are not suppressed either because these two silence frames precede the media frame 7. However, silence frames H, I and J are punctured.

The silence frames M and N are not suppressed because these two silence frames follow the media frame 8. However, out of silence frames O, P, Q, R and S that follow the silence frames M and N only the silence frame O is suppressed, as will be discussed below.

Figure 7:
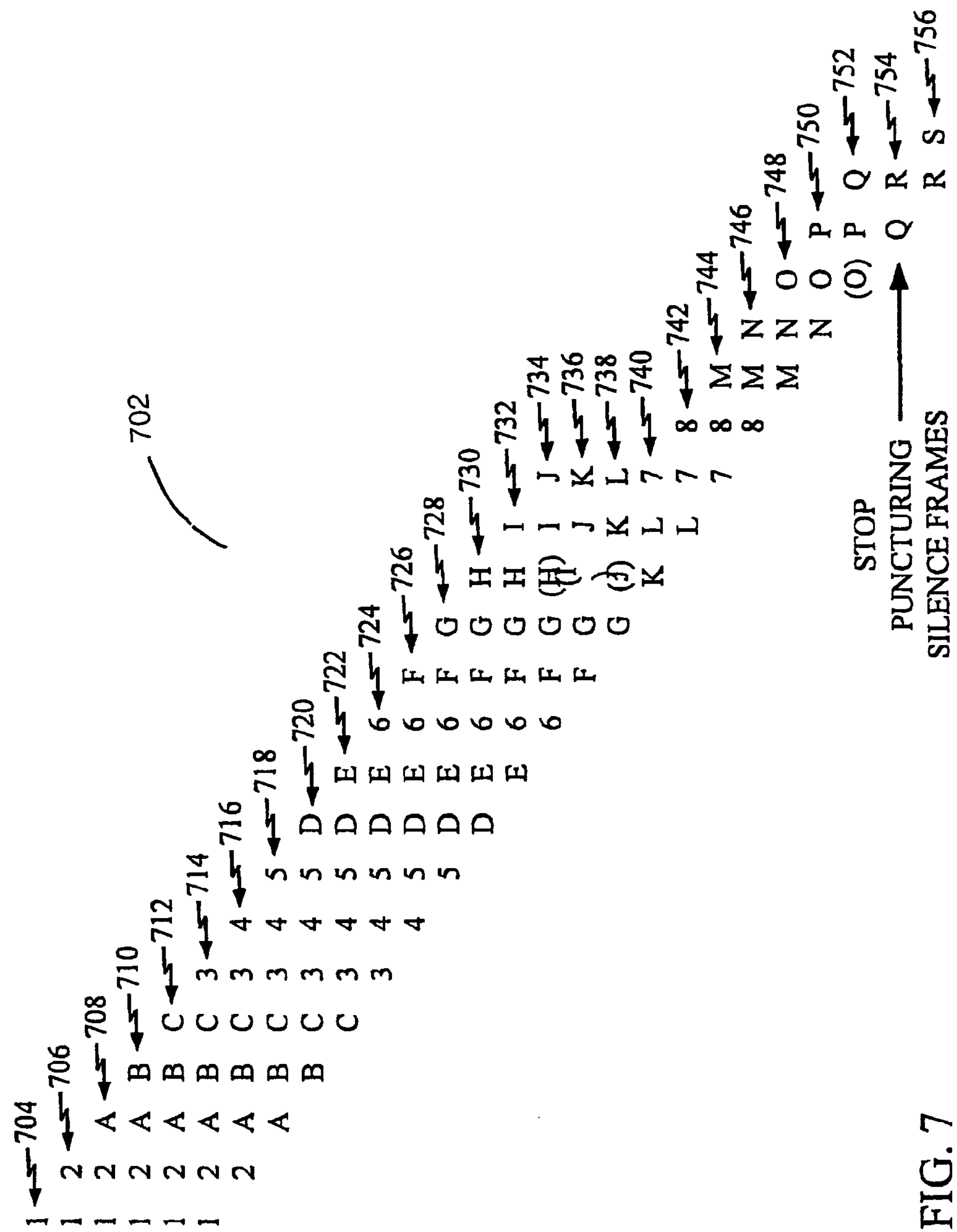
FIG. 7 illustrates media buffering for the silence-frame suppression process shown in FIG. 6.

FIG. 7 illustrates a media buffering scheme for the silence-frame suppression process shown in FIG. 6. The target CD receives the media stream 702, as discussed above in connection with FIG. 6. The talker's CD may buffer the media stream that it receives from a user at a buffer before starting to transmit the media stream to the target CDs. After receiving and buffering the first media spurt frame 1, the buffer content is shown by 704. After receiving and buffering the second media frame "2," the buffer holds the media frames "1" and "2" 706. Upon receiving and buffering the silence frames A, B, and C, the buffer contents are shown by 708, 710, and 712, respectively.

Assuming the buffer has a certain dept, e.g., five frames, upon receiving the fifth media frame "3," as shown by buffer content 714, the buffered frame "1" is transmitted to the target CD, and the received media buffer "3" is buffered. Similarly, upon receiving the media frame "4," as shown by buffer content 716, the buffered frame "2" is transmitted to the target CD, and the received media buffer "4" is buffered. Likewise, upon receiving the media frame "5," as shown by buffer content 718, the buffered silence frame A is transmitted to the target CD. In the same way, upon receiving each of the frames D, E, 6, F, G, H, and I, one buffered frame is transmitted, and the respective buffer contents are shown by 720 through 732.

When the silence frame J following four silence frames F, G, H, and I is received, as shown by 734, silence frame H is punctured, because the predetermined number of silence frames separating media frames 6 and 7, e.g., F, G, I and J, are kept in the buffer for transmission to the target CD. Similarly, when the silence frame K is received, as shown by 736, silence frame I is punctured, because the predetermined number of silence frames separating media frames 6 and 7, e.g., F, G, J, and K, are kept in the buffer for transmission to the target CD. At this point, the silence frame F is transmitted, upon receiving the silence frame K, and the buffer will contain three frames, e.g., G, J, and K.

Likewise, when the silence frame L is received, as shown by 738, silence frame J is punctured, because the predetermined number of silence frames separating media frames 6 and 7 are either transmitted, e.g., F, or are kept in the buffer, e.g., G, K, and L, for transmission to the target CD. At this point, silence frame G is transmitted upon receiving frame L, and the buffer contains two frames, e.g., K and L. When the media frame 7 is received, as shown by 740, silence frames K and L are not punctured, because they are the predetermined number of silence frames preceding media frame 7, e.g., 2, which are kept for transmission to the target CD. At this point, silence frame K is transmitted upon receiving frame 7, and the buffer contains two frames, e.g., L and 7.

The process of media buffering and transmission continues as shown by 742 through 750, when the buffer contains the silence frames N, O, and P, and the first silence frame M following the media frame 8 has been transmitted. When the talker's CD receives the silence frame Q, as shown by 752, the second silence frame N following the media frame 8 is transmitted. Realizing that the content of buffer shows that there are a predetermined number of silence frames for transmission, e.g., P and Q, before a possible upcoming media frame, the silence frame O is punctured and the silence frame P is transmitted.

However, when the talker's CD receives the silence frame R as shown by 754, realizing that the content of buffer shows that there is no silence frame other than the predetermined number of silence frames, here Q and R, before a possible upcoming media frame, no silence frame is removed, but the silence frame Q is transmitted. Similarly, when the talker's CD receives the silence frame S, as shown by 756, realizing that the content of buffer shows that there is no silence frame other than the predetermined number of silence frames, here R and S, before a possible upcoming media frame, no silence frame is removed, but the silence frame R is transmitted. As a result, among the sequence of the silence frames following the media frame 8, only the silence frame O is punctured.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration."

The invention claimed is:

1. A method of operating a client device that is configured to participate in a group call, the method comprising:

capturing, by the client device, a stream of media for the group call, wherein said stream of media comprises one or more silence frames;

evaluating, by the client device, the stream of media to identify the one or more silence frames;

determining, by the client device based on the evaluation, whether the one or more identified silence frames in the stream of media are positioned between successive media frames of the stream of media that each include non-silence media data;

automatically suppressing by the client device, the one or more identified silence frames from the captured stream of media to produce a suppressed stream of media based on the determination; and transmitting, by the client device, the suppressed stream of media over a network to one or more target devices that are separate from the client device and are participating in the group call with the client device.

2. The method of claim 1, wherein said suppressing includes suppressing an initial silence frame situated before a first media frame.

3. The method of claim 1, wherein said suppressing includes suppressing all initial silence frames situated before a first media frame.

4. The method of claim 1, wherein said suppressing includes suppressing a silence frame situated between the successive media frames.

5. The method of claim 4, wherein said suppressing a silence frame includes suppressing the silence frame that is in excess of a threshold number of silence frames situated between the successive media frames.

6. The method of claim 5, wherein said suppressing the silence frame includes suppressing the silence frame that follows a first threshold number of silence frames following a first media frame and precedes a second threshold number of silence frames proceeding a given media frame subsequent to the first media frame.

7. A non-transitory computer-readable storage medium embodying instructions, which, when executed by a client device that is participating in a group call, cause the client device to perform the instructions, the instructions comprising:

a set of instructions for causing the client device to capture a stream of media for the group call, wherein the stream of media comprises one or more silence frames;

a set of instructions for causing the client device to evaluate the stream of media to identify the one or more silence frames;

a set of instructions for causing the client device to determine, based on the evaluation, whether the one or more identified silence frames in the stream of media are positioned between successive media frames of the stream of media that each include non-silence media data;

a set of instructions for causing the client device to automatically suppress the one or more identified silence frames from the captured stream of media to produce a suppressed stream of media based on the determination; and a set of instructions for causing the client device to transmit the suppressed stream of media over a network to one or more target devices that are separate from the client device and are participating in the group call with the client device.

8. The non-transitory computer-readable storage medium of claim 7, wherein said set of instructions for causing the client device to automatically suppress is configured to cause the client device to suppress an initial silence frame situated before a first media frame.

9. The non-transitory computer-readable storage medium of claim 7, wherein said set of instructions for causing the client device to automatically suppress is configured to cause the client device to suppress all initial silence frames situated before a first media frame.

10. The non-transitory computer-readable storage medium of claim 7, wherein said set of instructions for causing the client device to automatically suppress is configured to cause the client device to suppress a silence frame situated between the successive media frames.

11. The non-transitory computer-readable storage medium of claim 10, wherein said set of instructions for causing the client device to automatically suppress is configured to cause the client device to suppress the silence frame that is in excess of a threshold number of silence frames situated between the successive media frames.

12. The non-transitory computer-readable storage medium of claim 11, wherein said set of instructions for causing the client device to automatically suppress is configured to cause the client device to suppress the silence frame that follows a first threshold number of silence frames following a first media frame and precedes a second threshold number of silence frames proceeding a given media frame subsequent to the first media frame.

13. A client device that is configured to participate in a group call, comprising:

means for capturing a stream of media for the group call, wherein said stream of media comprises one or more silence frames;

a controller configured to evaluate the stream of media to identify the one or more silence frames, to determine, based on the evaluation, whether the one or more identified silence frames in the stream of media are positioned between successive media frames of the stream of media that each include non-silence media data and to automatically suppress the one or more identified silence frames from the captured stream of media to produce a suppressed stream of media based on the determination; and means for transmitting the suppressed stream of media over a network to one or more target devices that are separate from the client device and are participating in the group call with the client device.

14. The client device of claim 13, wherein the controller is configured to suppress an initial silence frame situated before a first media frame.

15. The client device of claim 13, wherein the controller is configured to suppress all initial silence frames situated before a first media frame.

16. The client device of claim 13, wherein the controller is configured to suppress a silence frame situated between the successive media frames.

17. The client device of claim 16, wherein the controller is configured to suppress the silence frame that is in excess of a threshold number of silence frames situated between the successive media frames.

18. The client device of claim 17, wherein the controller is configured to suppress the silence frame that follows a first threshold number of silence frames following a first media frame and precedes a second threshold number of silence frames proceeding a given media frame subsequent to the first media frame.

19. A client device that is configured to participate in a group call, comprising:

a receiver capable of receiving information;

a transmitter capable of transmitting information; and a processor for evaluating a stream of media that is captured by the client device for the group call to identify one or more silence frames, to determine, based on the evaluation, whether the one or more identified silence frames in the stream of media are positioned between successive media frames of the stream of media that each include non-silence media data, to automatically suppress the one or more identified silence frames in the stream of media to produce a suppressed stream of media based on the determination, and to transmit the suppressed stream of media over a network to one or more target devices that are separate from the client device and are participating in the group call.

20. The client device of claim 19, wherein said suppressing includes suppressing processor is configured to suppress an initial silence frame situated before a first media frame.

21. The client device of claim 19, wherein said processor is configured to suppress all initial silence frames situated before a first media frame.

22. The client device of claim 19, wherein said processor is configured to suppress a silence frame situated between the successive media frames.

23. The client device of claim 22, wherein said processor is configured to suppress the silence frame that is in excess of a threshold number of silence frames situated between the successive media frames.

24. The client device of claim 23, wherein said processor is configured to suppress the silence frame that follows a first threshold number of silence frames following a first media frame and precedes a second threshold number of silence frames proceeding a given media frame subsequent to the first media frame.

25. The method of claim 1 further comprising buffering and then forwarding the suppressed stream of media.

26. The non-transitory computer-readable storage medium of claim 7 further comprising a set of instructions for causing the client device to buffer and then forward the suppressed stream of media.

27. The client device of claim 13 further comprising means for buffering and then forwarding the suppressed stream of media.

28. The client device of claim 19 wherein the processor further buffers and then forwards the suppressed stream of media.

29. The method of claim 1, wherein the stream of media includes a first set of silence frames that is adjacent to a first of the successive media frames, a second set of silence frames that is adjacent to a second of the successive media frames and a third set of silence frames that is not adjacent to either the first or second successive media frames, wherein the one or more identified silence frames that are automatically suppressed include the first and second sets of silence frames due to their positioning being adjacent to the first and second successive media frames, respectively, and wherein the third set of silence frames is not suppressed due to its positioning not being adjacent to the first and second successive media frames, respectively.

30. The method of claim 1, wherein the evaluating distinguishes between eighth-rate silence frames and eighth-rate media frames such that the one or more identified silence frames do not include any eighth-rate media frames.

31. The method of claim 1, wherein any eighth-rate media frames in the stream of media are not suppressed by the automatically suppressing despite having a frame rate that is the same as the one or more identified silence frames.

* * * * *